(12) United States Patent
Tsao et al.

(10) Patent No.: US 10,538,209 B2
(45) Date of Patent: Jan. 21, 2020

(54) VIDEO DISPLAY APPARATUS FOR VEHICLE

(71) Applicant: JET OPTOELECTRONICS CO., LTD., Taipei (TW)

(72) Inventors: Szu-Han Tsao, Taipei (TW); Tai-Hao Wen, Taipei (TW)

(73) Assignee: JET OPTOELECTRONICS CO., LTD., Taipei (TW)

( * ) Notice: Subject to any disclaimer, the term of this patent is extended or adjusted under 35 U.S.C. 154(b) by 337 days.

(21) Appl. No.: 15/255,196

(22) Filed: Sep. 2, 2016

(65) Prior Publication Data

US 2018/0065568 A1 Mar. 8, 2018

(51) Int. Cl.
*B60R 11/02* (2006.01)
*B60R 11/00* (2006.01)

(52) U.S. Cl.
CPC ... *B60R 11/0235* (2013.01); *B60R 2011/0028* (2013.01); *B60R 2011/0087* (2013.01)

(58) Field of Classification Search
CPC ....... B60R 11/0235; B60R 1/12; B60R 11/04; B60R 11/02; B60R 2011/0028; B60R 2011/0082; B60R 2001/1215; B60R 2001/1253; B60R 1/04; F16M 11/10; G06F 1/1616

See application file for complete search history.

(56) References Cited

U.S. PATENT DOCUMENTS

| 2009/0109352 A1* | 4/2009 | Lewis | B60R 11/0235 |
| | | | 348/837 |
| 2009/0167632 A1* | 7/2009 | Han | G06F 1/1601 |
| | | | 345/1.1 |
| 2016/0082888 A1* | 3/2016 | Kothari | B60R 1/00 |
| | | | 348/148 |

* cited by examiner

*Primary Examiner* — Farhan Mahmud
(74) *Attorney, Agent, or Firm* — Li & Cai Intellectual Property (USA) Office

(57) ABSTRACT

A video display apparatus includes a base, a video display installed on the base, and a fixing frame for fastening the base on a vehicle roof. The base has an elongated case. The case has a first end portion and an opposite second end portion. The fixing frame is pivotally connected to the first end portion, so the base is rotatable between a first position and a second position with respect to the fixing frame. When the fixing frame is fastened to the vehicle roof, a distance between the vehicle roof and the second end portion at the first position is more than that at the second position. The fixing frame has a mating surface for abutting against the vehicle roof. The area of the cross-section of the first end portion is less than three quarters of the area defined by the outer edge of the mating surface.

5 Claims, 16 Drawing Sheets

VIDEO DISPLAY APPARATUS FOR VEHICLE

BACKGROUND OF THE INVENTION

1. Field of the Invention

The instant invention relates to a video display apparatus for a vehicle, in particular, to a video display apparatus for fastening to a vehicle roof.

2. Description of Related Art

Please refer to FIG. 1, which shows a conventional video display apparatus 100' fastened to a vehicle roof 200'. The conventional video display apparatus 100' includes a base 10' and a screen 20' pivotally connected to the base 10'. The base 10' interior includes a circuit board and a plurality of electronic components. However, many improvements cannot be made due to the limitations of the current construction of the base 10'.

SUMMARY OF THE INVENTION

The instant disclosure provides a video display apparatus for a vehicle for effectively solving problems generated from the conventional video display apparatus.

The instant disclosure provides a video display apparatus for fastening to a vehicle roof, comprising: a base including an elongated case, wherein the case has a length, a width, and a height, the length is at least two times the width, and the length is at least two times the height, wherein the case includes an elongated side wall, a first end portion, and a second end portion, the first end portion and the second end portion are respectively located at two opposite ends of the side wall; at least one video display connected to the side wall of the base; and a fixing frame, comprising: a fixing portion for fastening to the vehicle roof, wherein the fixing portion has a mating surface for abutting against the vehicle roof, and an area of a cross-section of the first end portion is less than three quarters of an area defined by an outer edge of the mating surface; and a pivoting portion extended from the fixing portion and pivotally connected to the first end portion, wherein the base is rotatable with respect to the fixing frame between a first position and a second position; when the fixing frame is fastened to the vehicle roof, a distance between the vehicle roof and the second end portion of the base at the first position is more than a distance between the vehicle roof and the second end portion of the base at the second position.

In summary, the base of the video display apparatus in the instant disclosure is an elongated construction, and the mating surface of the fixing frame is related in size to the cross-section of the first end portion of the base. The mating surface of the fixing frame can be smaller than a mating surface of the conventional base. Thus, the video display apparatus of the instant disclosure can be mounted on different vehicle roofs (each having a different curved surface) by using an elongated base.

In order to further appreciate the characteristics and technical contents of the instant invention, references are hereunder made to the detailed descriptions and appended drawings in connection with the instant invention. However, the appended drawings are merely shown for exemplary purposes, rather than being used to restrict the scope of the instant invention.

DETAILED DESCRIPTION OF THE PREFERRED EMBODIMENTS

First Embodiment

Figure 1:
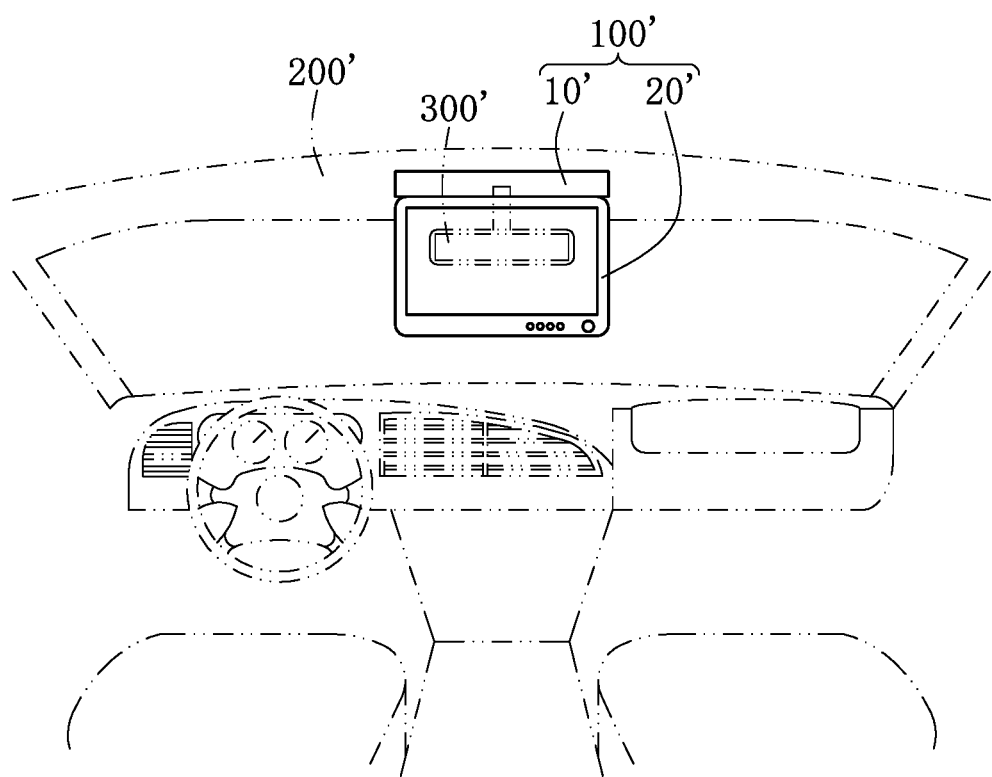
FIG. 1 is a schematic view showing a conventional video display apparatus fastened to a vehicle roof.
Figure 2:
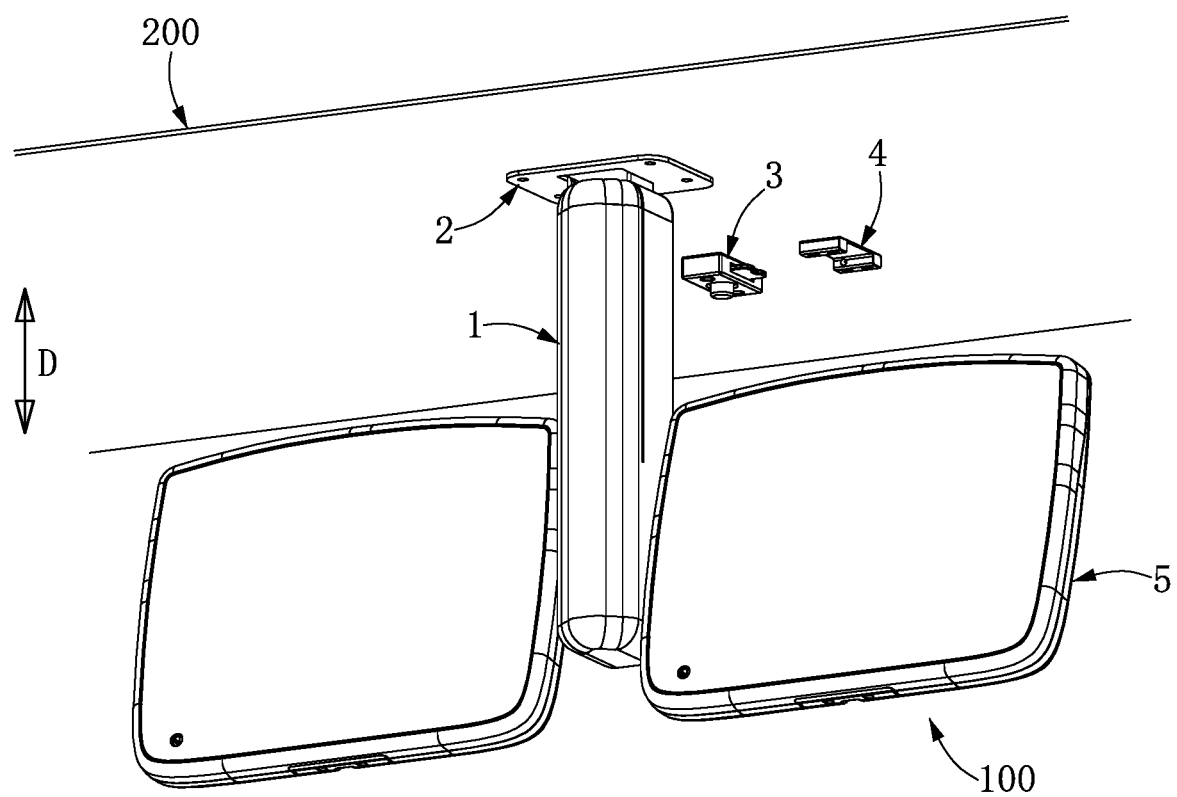
FIG. 2 is a perspective view showing a video display apparatus fastened to a vehicle roof and arranged at a first position according to a first embodiment of the instant disclosure.

Please refer to FIGS. 2 through 11, which show a first embodiment of the instant disclosure. References are hereunder made to the detailed descriptions and appended drawings in connection with the instant invention. However, the appended drawings are merely shown for exemplary purposes, rather than being used to restrict the scope of the instant invention.

As shown in FIGS. 2 through 6, the instant embodiment provides a video display apparatus 100 for fastening to a vehicle roof 200. The video display apparatus 100 includes an elongated base 1, a fixing frame 2, an engaging member 3, a positioning member 4, and at least one video display 5 connected to the base 1. The fixing frame 2, the engaging member 3, and the positioning member 4 are provided for fastening to the vehicle roof 200. It should be noted that the instant embodiment includes two video displays 4 for example, but the instant disclosure is not limited thereto. The following description discloses each component of the video display apparatus 100, and then discloses the relationship between the components.

Figure 3:
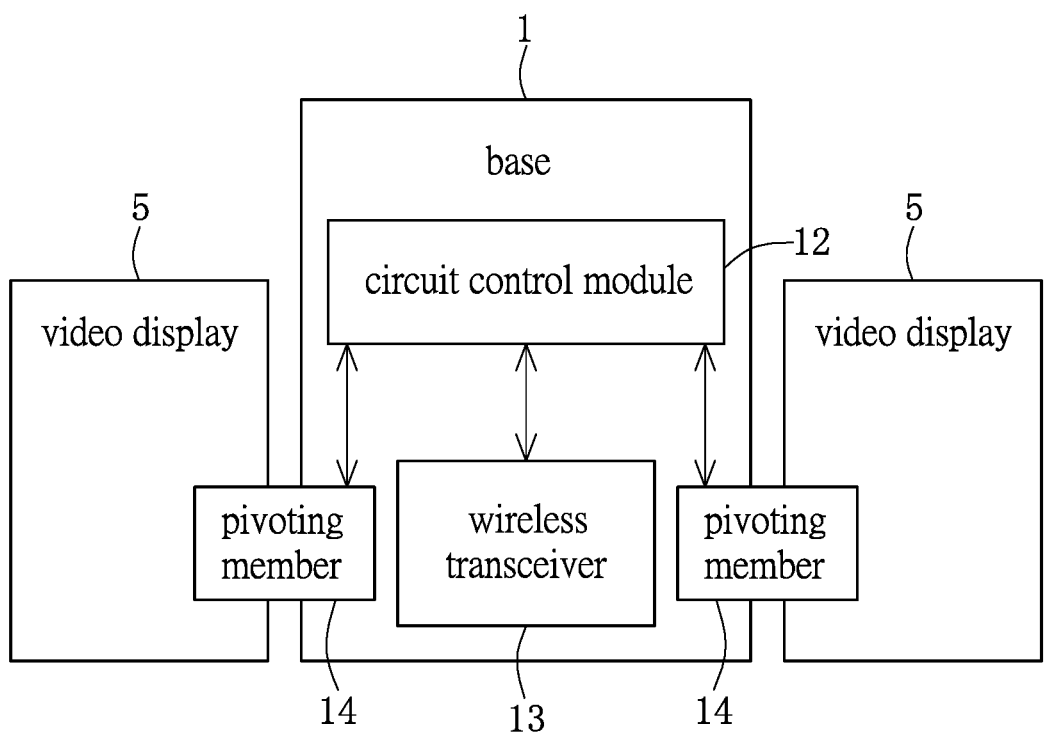
FIG. 3 is a functional block view showing the video display apparatus of FIG. 2.
Figure 7:
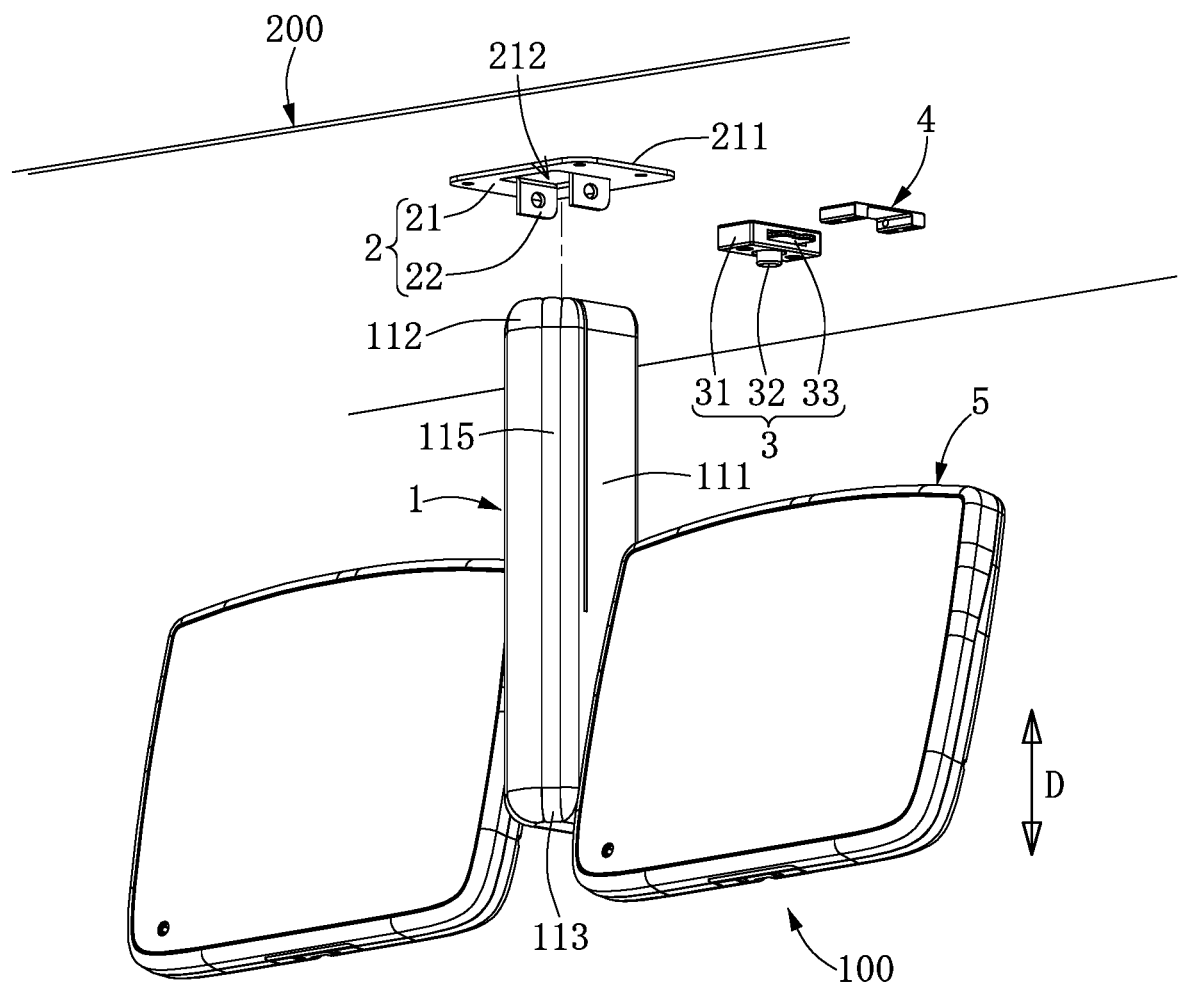
FIG. 7 is an exploded view of FIG. 2.
Figure 8:
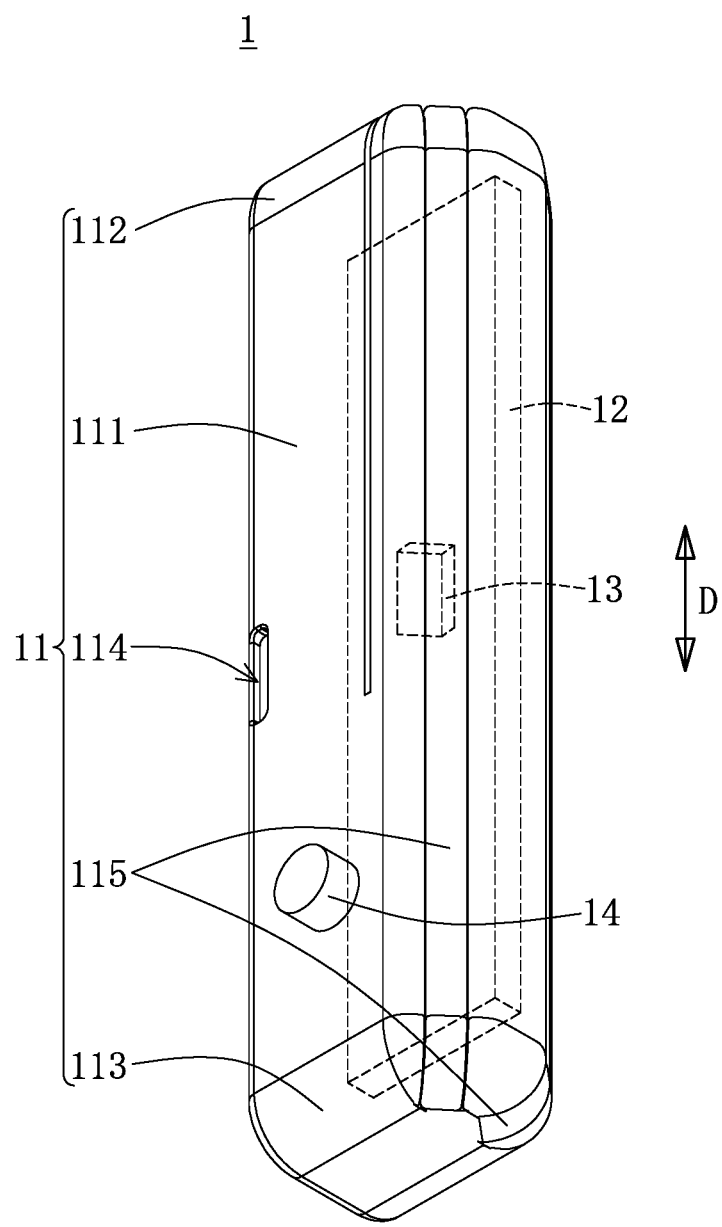
FIG. 8 is a perspective view showing a base of the video display apparatus.

As shown in FIGS. 7 and 8, the base 1 includes an elongated case 11, a circuit control module 12 and a wireless transceiver 13 both arranged in the case 11, and two pivoting members 14 respectively located at two opposite sides of the case 11. The wireless transceiver 13 and the two pivoting members 14 in the instant embodiment are electrically connected to the circuit control module 12 (as shown in FIG. 3). Alternatively, the two pivoting members 14 can support the weight of the video displays 5 only and are not electrically connected to the circuit control module 12, but at least one conductive wire (not shown) electrically connected between the circuit control module 12 and the video displays 5 can pass through the two pivoting members 14. Specifically, the wireless transceiver 13 in the instant embodiment can be a wireless receiver, a wireless transmitter, a Wi-Fi transmitter, a Wi-Fi receiver, an infrared transmitter, an infrared receiver, a Bluetooth transmitter, a Bluetooth receiver or any other element with similar functions, and the instant disclosure is not limited thereto. The wireless transceiver 13 may have any combination of these functions: to receive commands from a remote device such as remote control, to send commands to a remote device, to transmit audio to a remote device such as Bluetooth headset or infrared headset, to receive audio from a remote device, to transmit video to a remote device, to receive video from a remote device.

Figure 4:
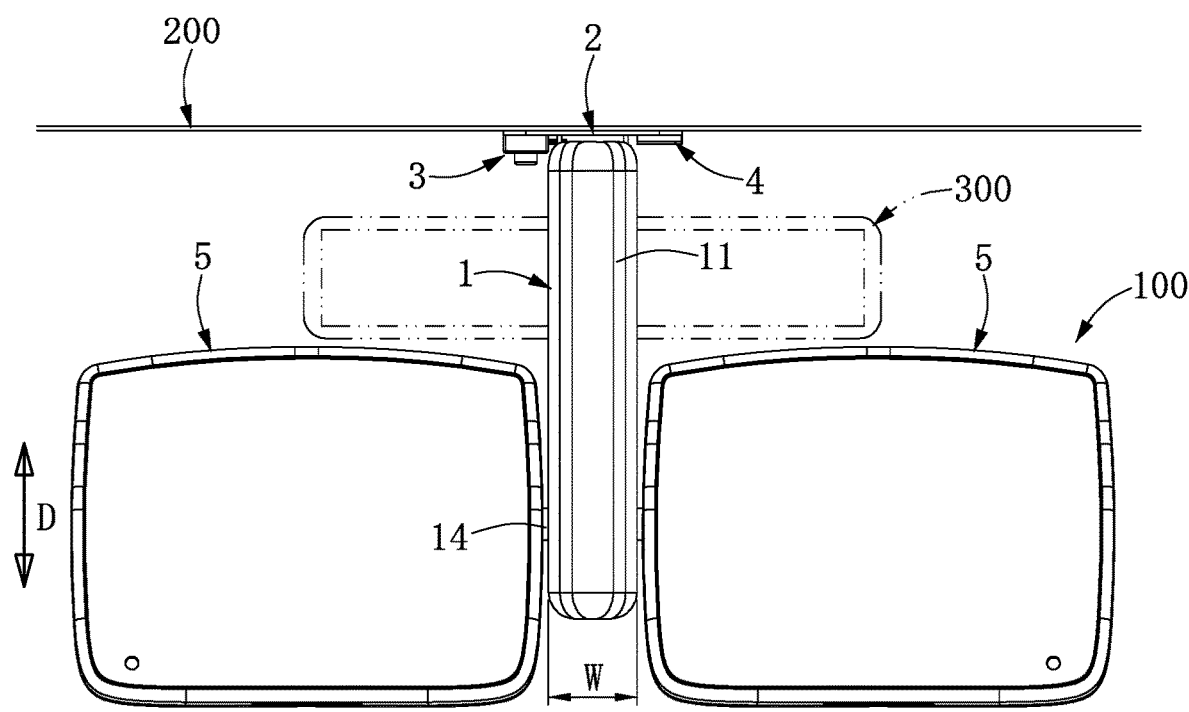
FIG. 4 is a front view of FIG. 2.
Figure 5:
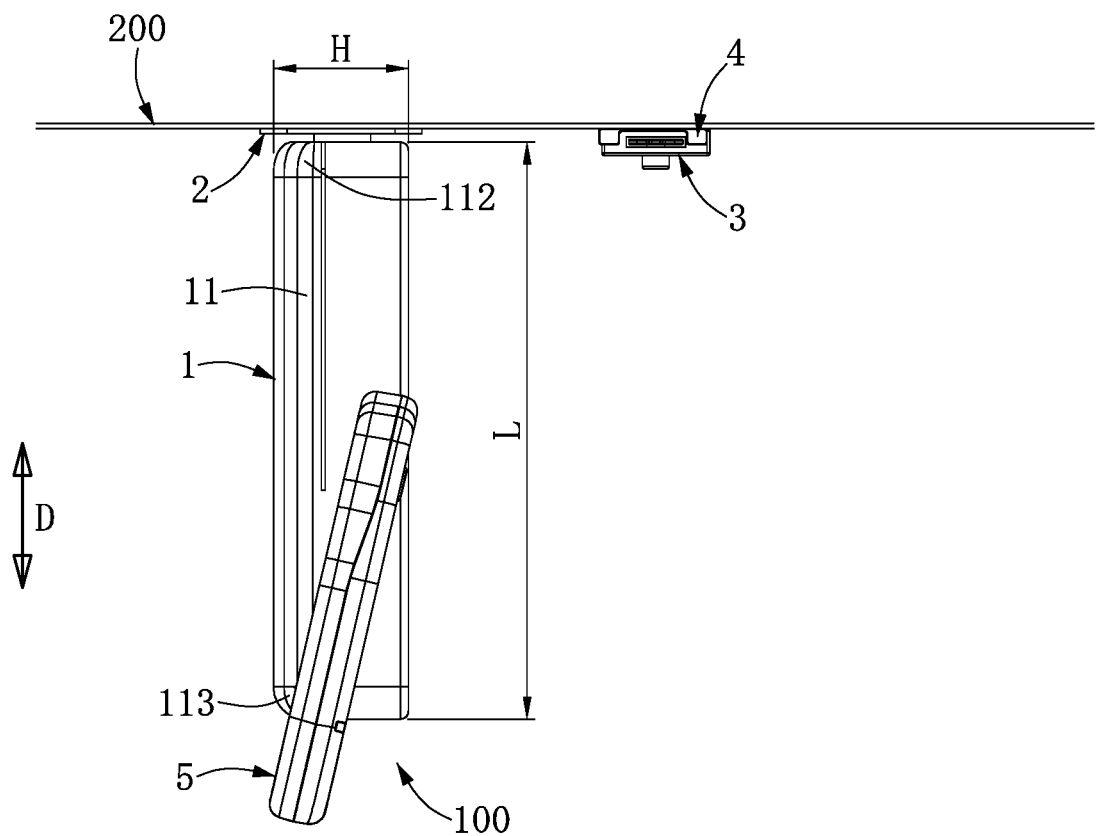
FIG. 5 is a side view of FIG. 2.
Figure 6:
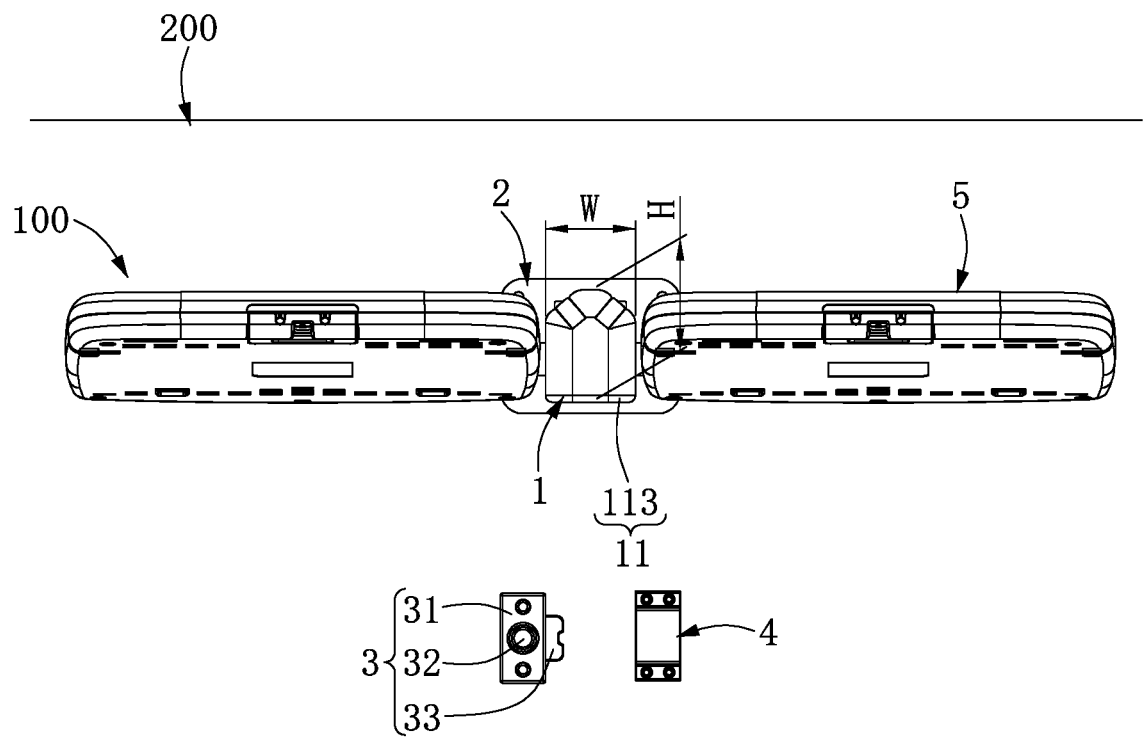
FIG. 6 is a bottom view of FIG. 2.

The case 11 includes an elongated side wall 111, a first end portion 112, and a second end portion 113. The first end portion 112 and the second end portion 113 are respectively located at two opposite ends of the side wall 111. The case 11 has an engaging portion 114 located between the first end portion 112 and the second end portion 113, that is to say, the engaging portion 114 is formed on the side wall 111. Moreover, as shown in FIGS. 4 through 6, the case 11 has a length L, a width W, and a height H. The length L is at least two times the width W and is at least two times the height H. For example, the length L could be at least three times the width W and at least three times the height H. For the elongated case 11 in the instant embodiment, the length L is five times the width W and is four times the height H, but the instant disclosure is not limited thereto.

As shown in FIGS. 5, 7, and 8, the length L of the case 11 defines a longitudinal direction D. A longitudinal direction of the side wall 111 is parallel to the longitudinal direction D, and the first end portion 112 and the second end portion 113 are respectively located at two opposite sides of the length L (i.e., the top end and the bottom end of the side wall 111 shown in FIG. 8). Moreover, the case 11 has at least one translucent region 115, and the translucent region 115 in the instant embodiment is a narrow strip extending from the first end portion 112 to the second end portion 113. The translucent region 115 and the two video displays 5 roughly face the same direction, thereby preventing the video displays 5 from blocking the translucent region 115.

The circuit control module 12 includes at least one circuit board (not shown), a plurality of conductive wires (not shown) connected between the circuit boards, and a plurality of electronic components (not shown) mounted on the circuit board, such that the video display apparatus 100 can be operated via the circuit control module 12. In a non-shown embodiment, the video display apparatus 100 can be provided without the circuit control module 12, and the video display apparatus 100 can deal with the signal sent to the wireless transceiver 13 by using a circuit board built inside the video display 5.

The wireless transceiver 13 in the instant embodiment is mounted on the circuit control module 12 and is disposed such that the wireless transceiver 13 is free to receive and/or send signals through the translucent region 115. That is to say, the wireless transceiver 13 can receive and/or emit a signal in a predetermined range through the translucent region 115, and video display 5 is not in the way. It should be noted that the circuit control module 12, the wireless transceiver 13, and the translucent region 115 do not have to be inside the case 11; any of them could be inside the video displays 5, instead, for example. Also, the physical parts of the circuit control module 12, the wireless transceiver 13, and the translucent region 115 could reside in both the case 11 and the video display 5.

The two pivoting members 14 are located close to the second end portion 113, that is to say, a distance between each pivoting member 14 and the second end portion 113 is less than a distance between each pivoting member 14 and the first end portion 112. The two pivoting members 14 are respectively located at two opposite sides of the side wall 111 of the base 1 (i.e., the left side and the right side of the side wall 111 shown in FIG. 8). Moreover, part of each pivoting member 14 protrudes from the case 11 to structurally (and optionally electrically) connect to the corresponding video display 5, but the instant disclosure is not limited thereto. For example, in a non-shown embodiment, the pivoting member 14 can be concavely formed on an outer surface of the case 11.

Figure 9:
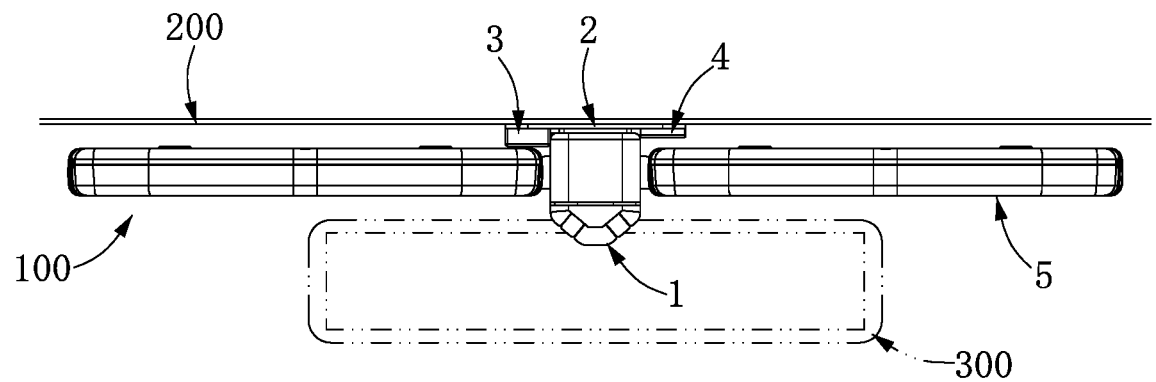
FIG. 9 is a front view showing the video display apparatus fastened to the vehicle roof and arranged at a second position according to the first embodiment of the instant disclosure.
Figure 10:
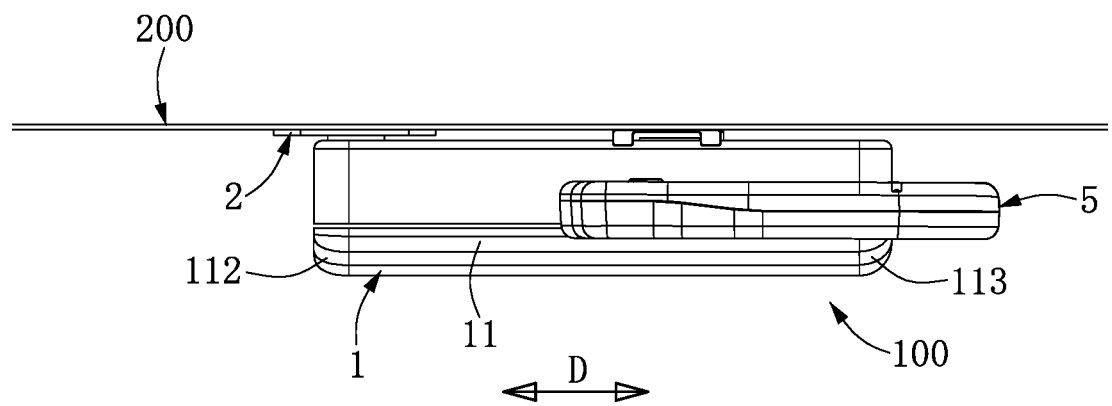
FIG. 10 is a side view of FIG. 9.
Figure 11:
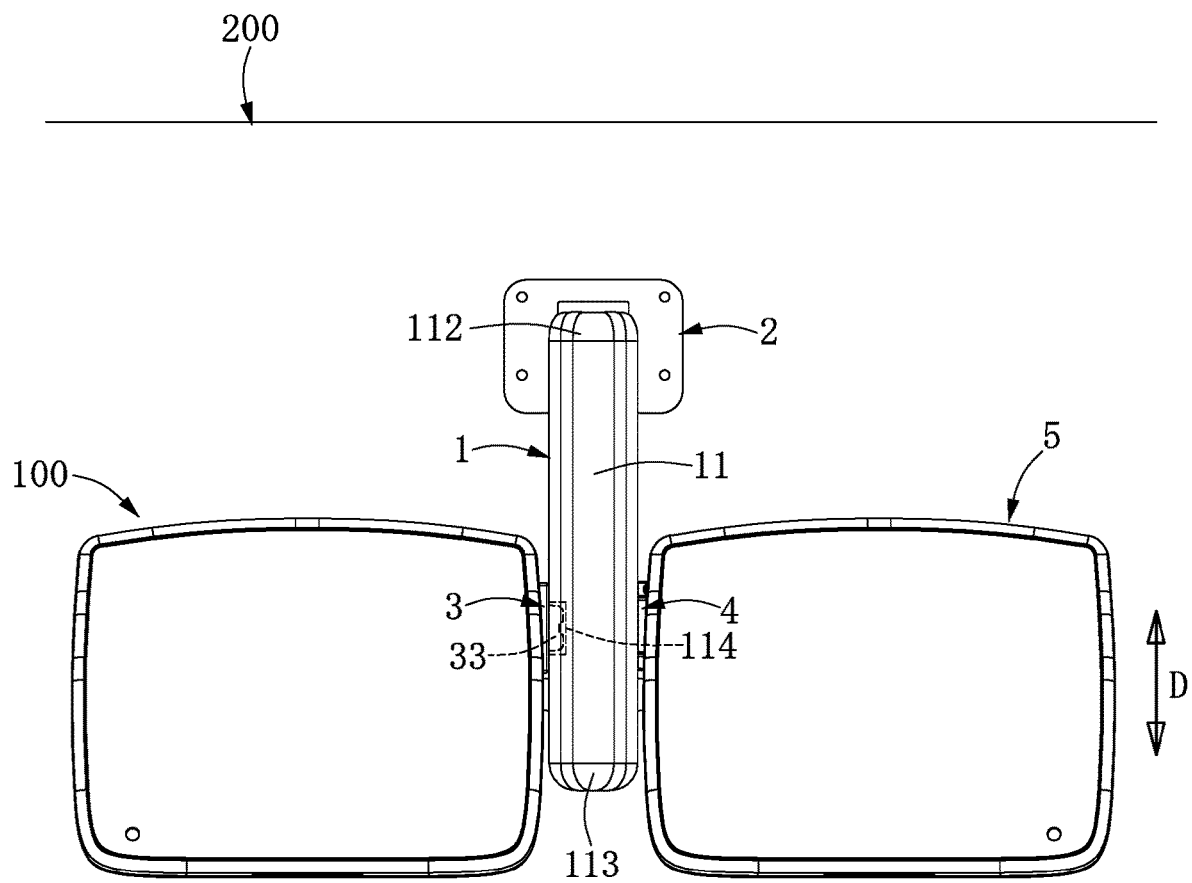
FIG. 11 is a bottom view of FIG. 9.

As shown in FIGS. 3 and 7, the fixing frame 2 is fastened to (i.e., screwed to) the vehicle roof 200, and the fixing frame 2 is pivotally connected to the first end portion 112 of the base 1 so that the base 1 is rotatable with respect to the fixing frame 2 between a first position (as shown in FIGS. 4 through 6) and a second position (as shown in FIGS. 9 through 11). Specifically, when the fixing frame 2 is fastened to the vehicle roof 200, a distance between the vehicle roof 200 and the second end portion 113 of the base 1 at the first position is more than a distance between the vehicle roof 200 and the second end portion 113 of the base 1 at the second position. That is to say, when the base 1 is rotated with respect to the fixing frame 2 from the first position to the second position, a distance between the vehicle roof 200 and the first end portion 112 is fixed, and the distance between the vehicle roof 200 and the second end portion 113 is gradually decreased.

The fixing frame 2 in the instant embodiment includes a fixing portion 21 and a pivoting portion 22 integrally extended from the fixing portion 21. The fixing portion 21 is configured to fasten to (screw to) the vehicle roof 200. The pivoting portion 22 is pivotally connected to the first end portion 112 of the case 1 for enabling the base 1 to rotate with respect to the fixing frame 2 between the first position and the second position.

Thus, the video display apparatus 100 in the instant embodiment is provided without entirely blocking the interior rear-view mirror 300 by using the elongated case 11 (or base 1) and by adjusting the position of the video display 5 by rotating the base 1, so a safety problem that the conventional screen 20' entirely blocks the interior rear-view mirror 300' as shown in FIG. 1 can be solved.

Specifically, the fixing portion 21 is a plate and has a mating surface 211 for abutting against the vehicle roof 200. An area defined by an outer edge of the first end portion 112 is less than three quarters of an area defined by an outer edge of the mating surface 211. Moreover, the area defined by the outer edge of the first end portion 112 in the instant embodiment is an area of a cross-section of the first end portion 112 perpendicular to the longitudinal direction D. The outer edge of the mating surface 211 in the instant embodiment has a quadrilateral shape, and the area defined by the outer edge of the mating surface 211 in the instant embodiment is an area of the quadrilateral shape, but the instant disclosure is not limited thereto.

Accordingly, the base 1 is an elongated construction, allowing itself to be smaller than the conventional base 10'. That is to say, the video display apparatus 100 of the instant disclosure could be applied to different vehicle roofs 200 (each having a different curved surface) because the fixing frame 2 is small and is likely to fit more than one curved surface without having to be modified.

Moreover, the conventional base 10' is screwed onto the vehicle roof 200', so the construction of the conventional base 10' is limited to the vehicle roof 200'. However, the base 1 of the instant embodiment is fastened to the fixing frame 2, which is fastened to the vehicle roof 200. So the construction of the base 1 is not necessarily limited to the vehicle roof 200.

In addition, the fixing portion 21 has an inner wall defining an opening 212, and the opening 212 is preferably arranged at the center of the fixing portion 21. The pivoting portion 22 in the instant embodiment has two pivoting arms that are bent by about 90 degrees from the inner wall of the fixing portion 21. The pivoting arms and the first end portion 112 of the base 1 can be pivotally connected in many different ways; further details of the connection between the pivoting arms and the first end portion 112 are not disclosed in the instant embodiment. For example, the base 1 has at least one pivoting shaft (not shown) inserted through the first end portion 112 and each pivoting arm.

As shown in FIGS. 1 and 8, the engaging member 3 is provided for fastening the base 1 to (i.e., screwing to) the vehicle roof 200, and the engaging member 3 is arranged at one side of the engaging portion 114 of the base 1 at the second position (i.e., the left side of the engaging portion 114 shown in FIG. 11), so the engaging member 3 can detachably engage with the engaging portion 114 of the base 1 at the second position, thereby keeping the base 1 stable at the second position. Thus, the base 1 of the video display apparatus 100 can stably support the video displays 5 at the second position by the cooperation between the engaging member 3 and the engaging portion 114 of the base 1.

Specifically, the engaging portion 114 of the base 1 in the instant embodiment is a small opening or a notch on the side wall 111 of the case 11. The engaging member 3 includes a box 31, a button 32, and a latch 33. To move from the first position to the second position, the user can press the button 32 to retract the latch 33 into the box 31, move the base 1 to the second position, and release the button 32 so that the latch 33 goes into the engaging portion 114 of the case 11 to fasten the case 11 to the vehicle roof 200. To move from the second position to the first position, the user can press the button 32 to retract the latch 33 into the box 31, move the base 1 to the first position, and release the button 32. In a non-shown embodiment, the latch 33 can be a guiding inclined surface. When the guiding inclined surface is pressed by the engaging portion 114 of the base 1, the guiding inclined surface is moved into the box 31. And then, when the engaging portion 114 is aligned with the latch 33, the guiding inclined surface is moved from the box 31 to the engaging portion 114 for fixing the base 1 at the second position. Other methods of fastening the base 1 to the vehicle roof 200 are possible such as using sliding rails as an engaging member and using hard rubber as an engaging member, but the instant disclosure is not limited thereto.

As shown in FIGS. 7, 8 and 11, the positioning member 4 is provided for fastening to (i.e., screwing to) the vehicle roof 200, and the positioning member 4 is located at another side of the engaging portion 114 of the base 1 at the second position (i.e., the right side of the engaging portion 114 shown in FIG. 11). That is to say, the positioning member 4 and the engaging member 3 are respectively located at two opposite sides of the engaging portion 114 of the base 1 at the second position. The positioning member 4 is configured to work with the engaging member 3 to keep the base 1 stable at the second position.

As shown in FIGS. 3, 7, and 8, the two video displays 5 are connected to the base 1 and are electrically connected to the circuit control module 12. The two video displays 5 in the instant embodiment are respectively installed on the two pivoting members 14, and are electrically connected to the circuit control module 12 via the two pivoting members 14. The detailed construction of each pivoting member 14 is not disclosed in the instant embodiment.

Each video display 5 in the instant embodiment is detachably and pivotally connected to the corresponding pivoting member 14, so the number of the video display 5 of the video display apparatus 100 can be adjusted according to the user's demand, and each video display 5 can be easily separated from the base 1 for repairing.

Specifically, when the base 1 is at the first position, each video display 5 provides video information (e.g. a movie) for the rear passengers. When the base 1 is at the second position, the video display apparatus 100 may have any of the following features: each video display 5 emits light when a specific condition is met (e.g., when the door is opened); upon receiving a command from a remote control, the wireless transceiver 13 can pass the command to the circuit control module 12 for triggering the video display apparatus 100 to perform a function such as playing music or turning on light. The source of the light can be the video display 5 or an independent lighting device mounted on the case 11 or a housing of the video display 5. Moreover, a switch can be disposed on the case 11 or the video display 5 for controlling the video displays 5 to play music or emit light.

The video display apparatus 100 in the instant embodiment includes the two video displays 5 for example, but the instant disclosure is not limited thereto. For example, the video display apparatus 100 can include only one video display 5 and the related components (e.g., one pivoting member 14). Moreover, the position of the engaging member 3 and the positioning member 4 can be adjusted according to the user's demand, and is not limited to the figures. For example, the engaging member 3 and the positioning member 4 can be fastened to a portion of the vehicle roof 200 close to the rear passengers, or can be fastened to a portion of the vehicle roof 200 close to the front passengers for making the second end portion 113 of the base 1 arranged at the second position close to the interior rear-view mirror 300. Regardless of the position of the engaging member 3 and the positioning member 4, the translucent region 115 need to face downward when the base 1 is at the second position and the video displays 5 need to face toward the rear passengers when the base 1 is at the first position.

Second Embodiment

Figure 12:
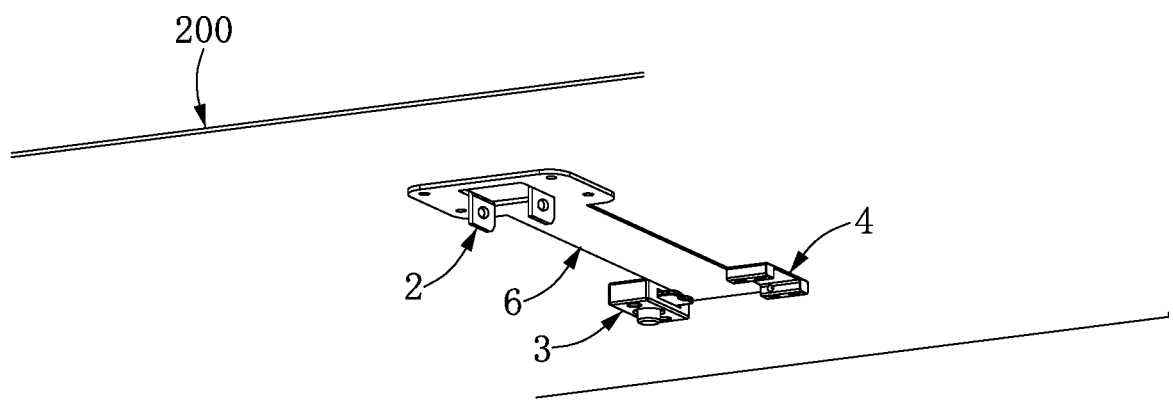
FIG. 12 is a perspective view of a fixing frame fastened to the vehicle roof according to a second embodiment of the instant disclosure.

Please refer to FIG. 12, which shows a second embodiment. The second embodiment is similar to the first embodiment; so the identical features are not disclosed again. The different features of the instant embodiment are disclosed as follows. The video display apparatus 100 in the instant embodiment further includes a connecting sheet 6, and the connecting sheet 6 connects the fixing frame 2, the engaging member 3, and the positioning member 4. In a non-shown embodiment, the positioning member 4 can be replaced with another engaging member 3. That is to say, the video display apparatus 100 includes two engaging members 3 and the relative components (e.g., the base 1 has two engaging portions 114 formed on the case 11). In fact, the video display apparatus 100 could have one or more engaging member 3.

Third Embodiment

Figure 13:
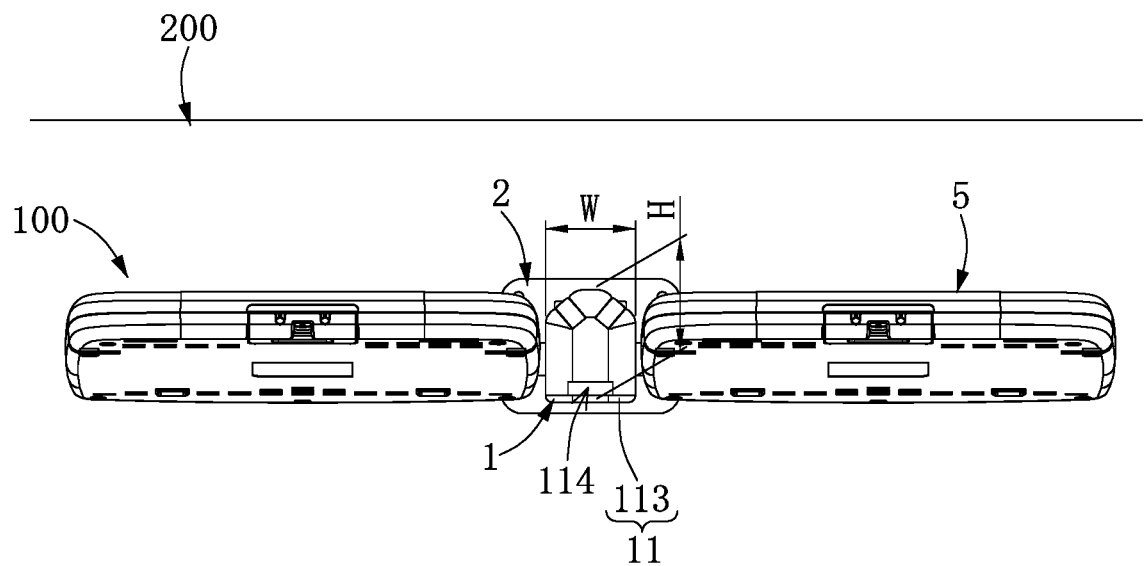
FIG. 13 is a bottom view showing the video display apparatus fastened to the vehicle roof and arranged at the first position according to a third embodiment of the instant disclosure.
Figure 14:
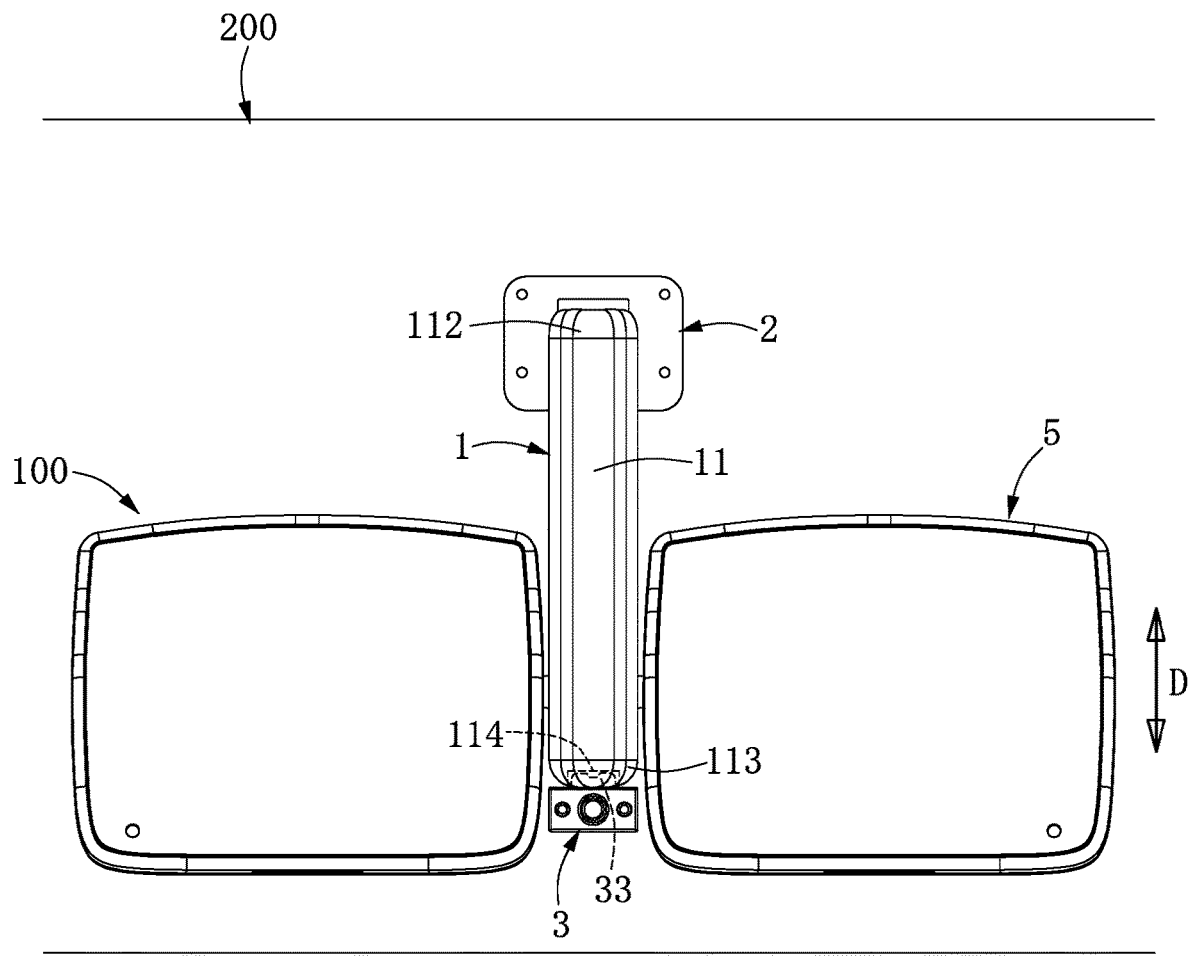
FIG. 14 is a bottom view showing the video display apparatus fastened to the vehicle roof and arranged at the second position according to a third embodiment of the instant disclosure.

Please refer to FIGS. 13 and 14, which show a third embodiment. The third embodiment is similar to the first and second embodiments; so the identical features are not disclosed again. The different features of the instant embodiment are disclosed as follows. The video display apparatus 100 in the instant embodiment is provided without the positioning member 4. The engaging portion 114 is located on the distal end of the second end portion 113, and the engaging member 3 is arranged corresponding to the engaging portion 114 for engaging with the engaging portion 114 when the base 1 is at the second position. In a non-shown embodiment (similar to FIG. 12), video display apparatus 100 can be provided with the connecting sheet 6 to connect the fixing frame 2 and the engaging member 3. In a non-shown embodiment, the engaging member 3 and the engaging portion 114 can be located anywhere as long as they engage each other to keep the base 1 fastened to the vehicle roof 200 when the video display apparatus 100 is at the second location. For example, the engaging member 3 and the engaging portion 114 can be located at the middle of the base 1.

Fourth Embodiment

Figure 15:
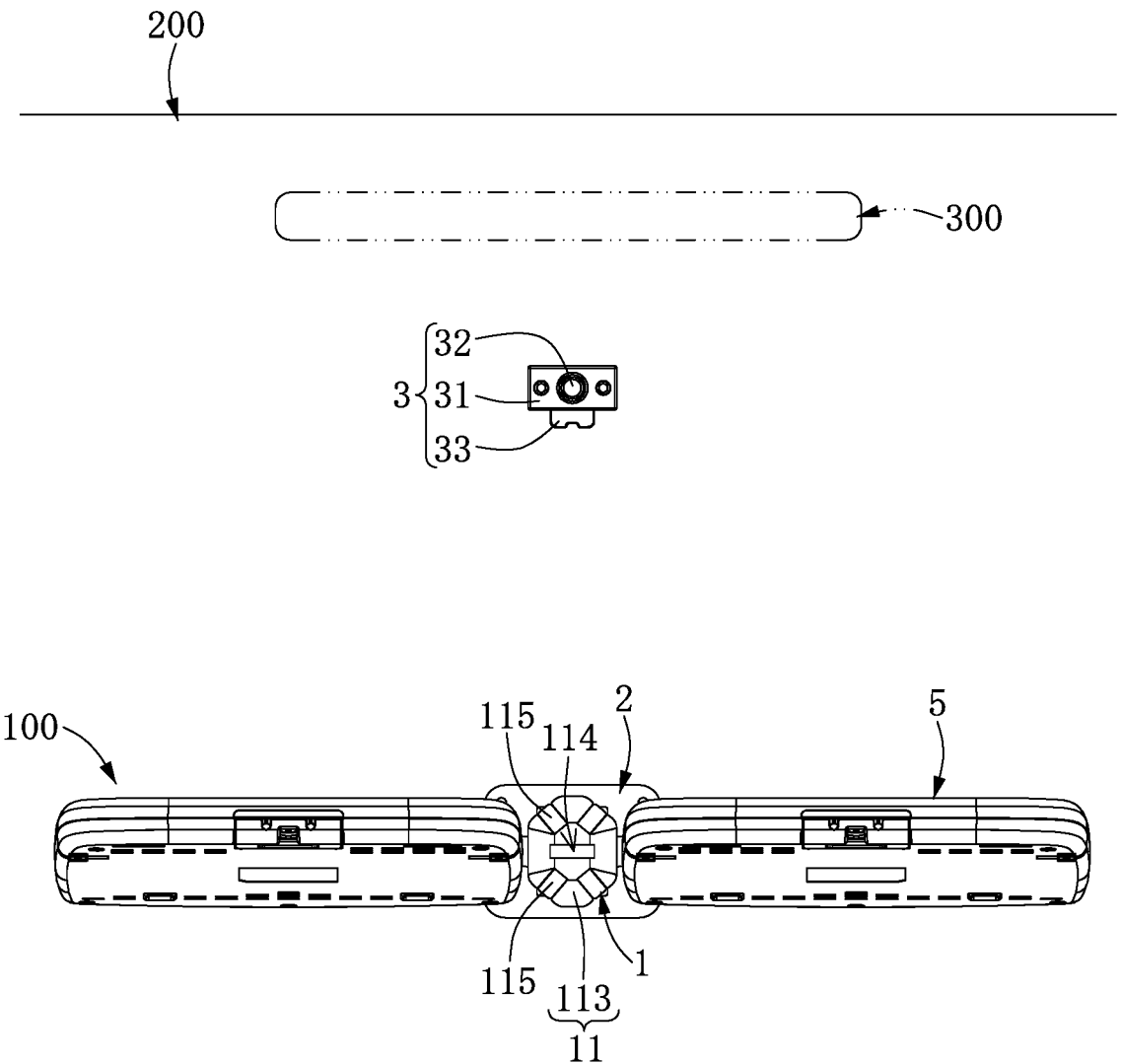
FIG. 15 is a bottom view showing the video display apparatus fastened to the vehicle roof and arranged at the first position according to a fourth embodiment of the instant disclosure.

Please refer to FIG. 15, which shows a fourth embodiment. The fourth embodiment is similar to the first, second, and third embodiments; so the identical features are not disclosed again. The different features of the instant embodiment are disclosed as follows. The case 11 in the instant embodiment includes two translucent regions 115 arranged at two opposite sides thereof. The video display apparatus 100 includes two engaging members 3, one of the engaging members 3 is disposed between the fixing frame 2 and the interior rear-view mirror 300, and the other engaging member 3 is disposed on the other side of the fixing frame 2. Thus, the base 1 can engage and disengage with either of the engaging members 3 according to the user's demands. Besides, the video display apparatus 100 of the instant disclosure can omit one of the two engaging members 3.

Fifth Embodiment

Figure 16:
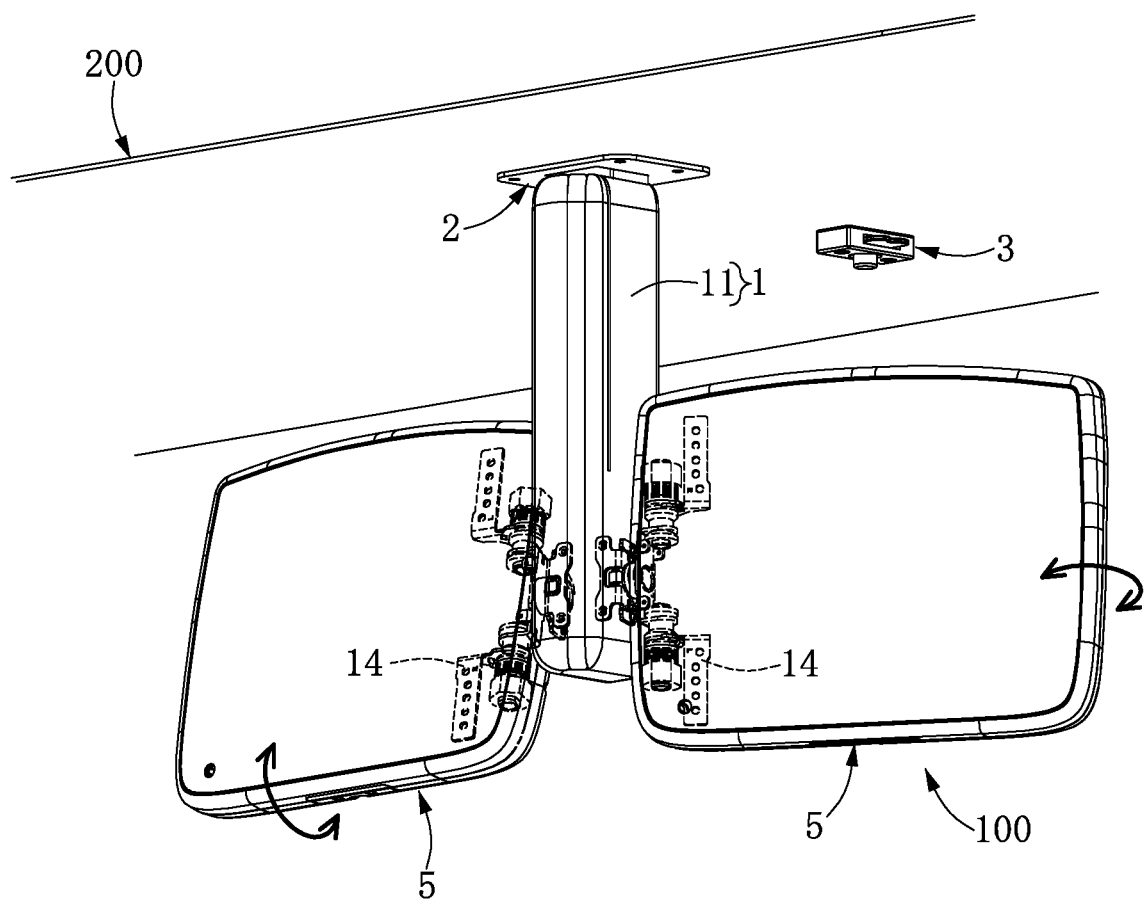
FIG. 16 is a perspective view showing the video display apparatus fastened to the vehicle roof according to a fifth embodiment of the instant disclosure.
Figure 17:
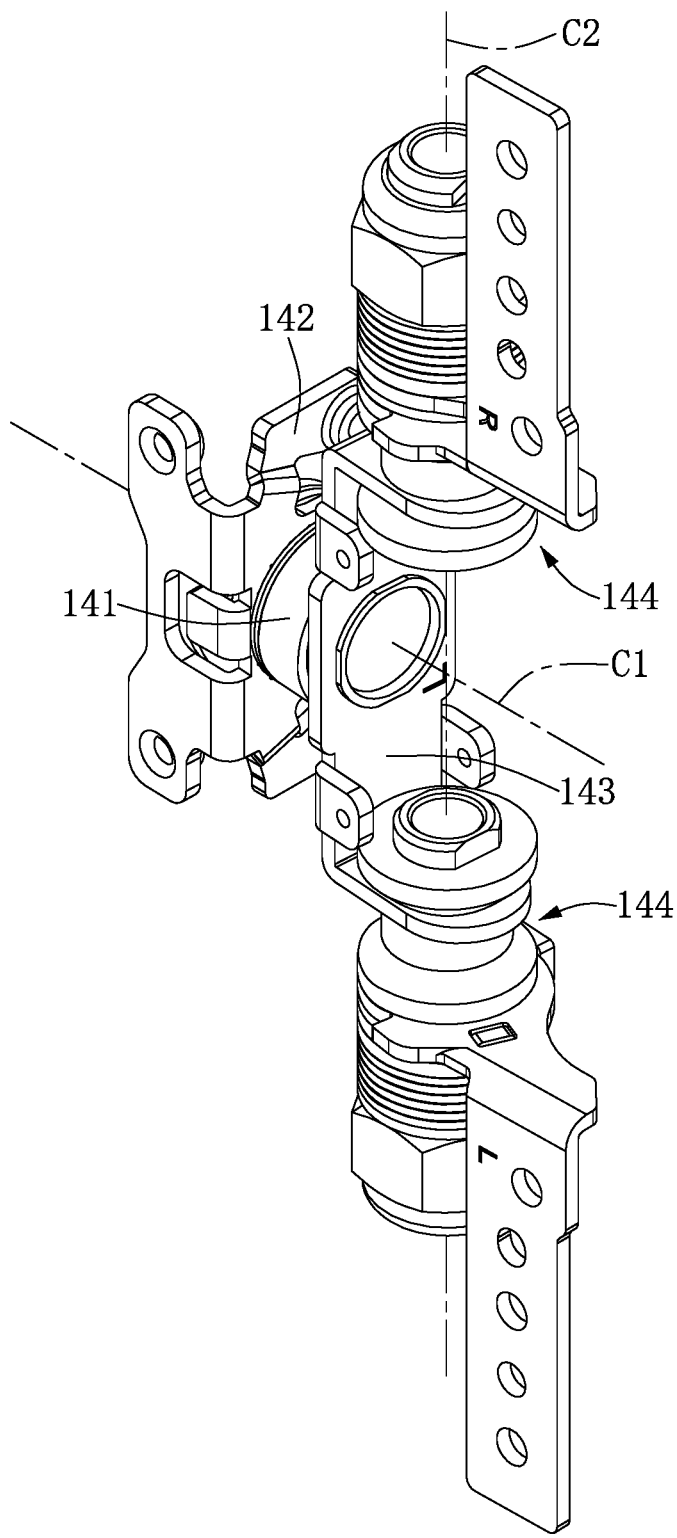
FIG. 17 is a perspective view showing a pivoting member of FIG. 16.

Please refer to FIGS. 16 and 17, which show a fifth embodiment. The fifth embodiment is similar to the first, second, third, and fourth embodiments; so the identical features are not disclosed again. The different feature of the instant embodiment is the construction of the pivoting member 14. Specifically, each pivoting member 14 is configured to rotate the corresponding video display 5 with respect to the case 11. The pivoting member 14 in the instant embodiment includes a tubular fixing shaft 141, a positioning frame 142 and a rotatable frame 143 respectively installed on two opposite ends of the fixing shaft 141, and two hinge structures 144 installed on two opposite ends of the rotatable frame 143.

The rotatable frame 143 is installed on the fixing shaft 141 and can spin with respect to the positioning frame 142 along a first axis C1. The two hinge structures 144 are attached to the corresponding video display 5 and are rotatable along a second axis C2 perpendicular to the first axis C1. Thus, each video display 5 can rotate with respect to the case 11 along the first axis C1 (i.e., the left double arrow in FIG. 16) or the second axis C2 (i.e., the right double arrow in FIG. 16) by using the corresponding pivoting member 14, thereby adjusting each video display 5 to a desired angle for the user.

The descriptions illustrated supra set forth simply the preferred embodiments of the instant invention; however, the characteristics of the instant invention are by no means restricted thereto. All changes, alterations, or modifications conveniently considered by those skilled in the art are deemed to be encompassed within the scope of the instant invention delineated by the following claims.

What is claimed is:

1. A video display apparatus for fastening to a vehicle roof between an interior rear-view mirror and a rear passenger seat, comprising:
    a base including an elongated rod-like case, a circuit module arranged in the case, and a wireless transceiver arranged in the case and electrically connected to the circuit control module, wherein the case has a length, a width, and a height, the length is at least two times the width, and the length is at least two times the height, wherein the case includes an elongated side wall, a first end portion, and a second end portion, the first end portion and the second end portion are respectively located at two opposite ends of the side wall, and the length is defined as a maximum distance between the first end portion and the second end portion, and wherein the case has two translucent regions each being in a narrow strip shape extending from the first end portion to the second end portion, the two translucent regions are respectively arranged on two opposite sides of the case, and the wireless transceiver is configured to receive a signal entering into the case by passing through any one of the two translucent regions;
    two video displays pivotally connected to the side wall of the base and arranged adjacent to the second end portion, wherein the two video displays are respectively arranged on two portions of the side wall opposite to each other, and each of the two video displays is independently rotatable relative to the base, wherein the base and each of the two video displays are rotatable for being cooperated with each other, and wherein the two translucent regions of the case are respectively arranged adjacent to the two video displays, and the circuit control module is electrically connected to the two video displays; and
    a fixing frame, comprising:
        a fixing portion for being fastened to the vehicle roof, wherein the fixing portion has a mating surface for abutting against the vehicle roof, and an area of a cross-section of the first end portion is less than three quarters of an area defined by an outer edge of the mating surface; and
        a pivoting portion extended from the fixing portion and pivotally connected to the first end portion, wherein the base is rotatable with respect to the fixing frame between a first position and a second position; when the fixing frame is fastened to the vehicle roof between the interior rear-view mirror and the rear passenger seat and the base is rotated with respect to the fixing frame from the first position to the second position, the second end portion of the base is rotated around the first end portion of the base by taking the first end portion as a rotational axis, a distance between the vehicle roof and the second end portion of the base at the first position is more than a distance between the vehicle roof and the second end portion of the base at the second position, and a distance between the vehicle roof and the first end portion of the base at the first position is equal to a distance between the vehicle roof and the first end portion of the base at the second position; and an engaging member and a positioning member both for being mounted on the vehicle roof at one side of the fixing frame away from the interior rear-view mirror so as to fasten the base to the vehicle roof, wherein the base has an engaging portion disposed between the first end portion and the second end portion, the engaging member detachably engages with the engaging portion of the base, wherein when the engaging portion of the base engages with the engaging member, the position of the base is defined as the second position, and the positioning member and the engaging member are respectively located at two opposite sides of the engaging portion so as to keep the base stable at the second position, wherein the engaging portion is an opening or a notch on the case, the engaging member includes a box, a button, and a latch, wherein the latch is configured to insert into the engaging portion of the base at the second position, and the button is configured to drive the latch to move into the box by pressing the button.

2. The video display apparatus as claimed in claim 1, wherein the length is at least three times the width, and the length is at least three times the height.

3. The video display apparatus as claimed in claim 1, wherein the fixing portion is a plate and has an inner wall defining an opening, the pivoting portion is bent from the inner wall of the fixing portion.

4. The video display apparatus as claimed in claim 1, wherein the base has at least one pivoting member, the at least one video display is detachably and pivotally connected to the at least one pivoting member, and the at least one video display is electrically connected to the circuit control module via the at least one pivoting member.

5. The video display apparatus as claimed in claim 1, further comprising a connecting sheet, wherein the connecting sheet connects the fixing frame and the engaging member.

* * * * *